United States Patent [19]
Groen et al.

[11] 3,728,353
[45] Apr. 17, 1973

[54] PREPARATION OF C-SUBSTITUTED PIPERIDINE

[75] Inventors: Siemen H. Groen; Johannes J. M. Deumens, both of Geleen; Petrus A. M. J. Stijfs, Merkelbeek, all of Netherlands

[73] Assignee: Stamicarbon N.V., Heerlen, Netherlands

[22] Filed: July 10, 1970

[21] Appl. No.: 54,001

[30] Foreign Application Priority Data

July 11, 1969 Netherlands .......................6910764

[52] U.S. Cl. ......................260/293.52, 260/465.5 R
[51] Int. Cl. .............................................C07d 29/06
[58] Field of Search.................................260/293.52

[56] References Cited

FOREIGN PATENTS OR APPLICATIONS 1,068,719  11/1959  Germany..........................260/293.52

*Primary Examiner*—Henry R. Jiles
*Assistant Examiner*—G. Thomas Todd
*Attorney*—Cushman, Darby & Cushman

[57] ABSTRACT

A process for the preparation of a carbon-substituted piperidine by the hydrogenation of a N-substituted γ-cyanoketoimine in the presence of a hydrogenation catalyst, is disclosed. A primary amine having the same substituent as the nitrogen atom of the starting γ-cyanoketoimine is receovered in high yield from the reaction mixture. The carbon substituted piperidines thus produced are useful as starting materials for the production of herbicides or pharmaceuticals.

7 Claims, No Drawings

PREPARATION OF C-SUBSTITUTED PIPERIDINE

BACKGROUND OF THE INVENTION

The present invention relates to a cyclization reaction resulting in the formation of C-substituted piperidines as products.

It is known as stated in the Journal of The American Chemical Society 1950, vol. 72, p. 2594 that in the hydrogenation of γ-cyanoketones, ring closure occurs with the formation of C-substituted piperidines. An example in point is the hydrogenation of 5-oxocapronitrile to the corresponding 2-methyl piperidine.

DETAILED DESCRIPTION OF THE INVENTION

It has now been found that the hydrogenation of N-substituted γ-cyanoketoimines can give a high yield of two reaction products, viz. a C-substituted piperidine in addition to a primary amine which has the same substituent attached to its nitrogen atom as is present on the nitrogen atom of the starting imine. This may be represented by the general reaction.

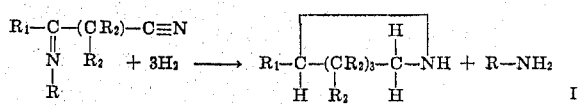

The R and $R_1$ substituents are alkyl, cycloalkyl or aryl groups having from one to 10 carbon atoms, for example methyl, ethyl, propyl, isopropyl, hexyl, cyclohexyl, phenyl and toluyl, and each of the six $R_2$ substituents is either a hydrogen atom or a substituent as R and $R_1$, provided that at least four of the $R_2$ substituents are hydrogen atoms.

This result is particularly surprising since the hydrogenation of N-substituted γ-cyanoketoimines would be expected, in principle, to yield other reaction products, for instance non-cyclic secondary amines or piperidines with the same substituent on their nitrogen atom as is present on the nitrogen atom of the imine.

Consequently, the present invention provides a process of preparing C-substituted piperidines which is characterized in that a N-substituted γ-cyanoketoimine is subjected to hydrogenation to form both a C-substituted piperidine and a primary amine having the same substituent on its nitrogen atom as is present on the nitrogen atom of the starting imine. The C-substituted piperidines thus produced are used for the production of herbicides and pharmaceuticals.

The C-substituted piperidine and the primary amine obtained by the process of the invention can be separated by several known methods, as for instance by fractional distillation.

The primary amine thus produced can be used to form additional starting material which may be illustrated as follows: If in the process according to the present invention the reaction is started, for instance from N-cyclohexyl-5-cyanopentanone-2-imine, the resulting products are 2-methyl piperidine and cyclohexyl amine. The resulting cyclohexyl amine can then be separated from the 2-methyl piperidine and used for the preparation of the starting product by first reacting this cyclohexyl amine with acetone in a known way as described in U.S. Pat. No. 2.583.729, the disclosure of which is hereby incorporated by reference, to form N-cyclohexyl acetonimine, according to the general reaction (where R represents cyclohexyl):

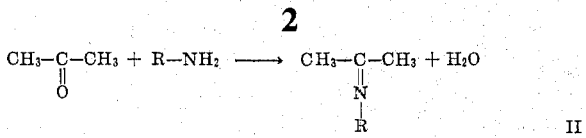

The acetonimine is then reacted with acrylonitrile according to U.S. Pat. Application No. 30597, Thoma et al filed Apr. 21, 1970 the disclosure of which is hereby incorporated by reference, as represented by the general reaction (where R again represents cyclohexyl):

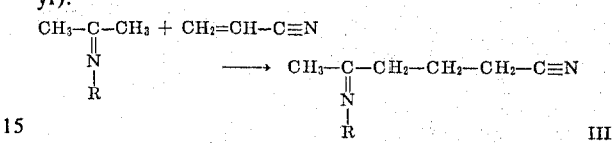

In this way, 2-methyl piperidine can be made in good yields using the relatively inexpensive starting materials acetone and acrylonitrile.

While it is also possible to react acrylonitrile with acetone to form 5-oxocapronitrile and then to hydrogenate this to 2-methyl piperidine, this method has the great disadvantage that the reaction of acrylonitrile with acetone gives only a low yield of the desired product and is therefore commercially unattractive.

The starting products needed for the preparation of other C-substituted piperidines according to the present invention can also be obtained in a known manner (as for example the products disclosed in U.S. Pat. No. 2,768,962 the disclosure of which is hereby incorporated by reference), by preparing a ketoimine from the corresponding ketone and a primary amine, and then reacting this ketoimine with acrylonitrile as illustrated for acetone in general reactions II and III above. Thus according to the present invention, in the hydrogenation of the γ-cyanoketoimine, the primary amine used is reformed and recovered as a valuable by-product.

The process according to the present invention can be carried out in the presence of various known hydrogenation catalysts, for instance nickel, cobalt, platinum, platinum oxide and palladium, whether or not on a suitable support, or Raney catalysts such as Raney nickel, Raney nickel-chromium and Raney cobalt. For reasons of economy, Raney nickel, Raney cobalt, or another Raney catalyst is preferred.

The hydrogen required for the hydrogenation need not be pure. The presence of an inert gas, e.g. nitrogen, in addition to the hydrogen is not objectionable.

The hydrogenation reaction can be effected at atmospheric pressure as well as at a higher pressure. Superatmospheric pressures, for example pressures over 300 atmospheres, can also be applied. However, for practical purposes such high pressures are of little importance. The preferred range is from about 1–150 atmospheres and more preferably from about 5 to 135 atmospheres. Subatmospheric pressures can also be used.

The temperature of the reaction may also be varied, but is preferably between about 35° and about 300°C and more preferably between 50° and 175°C in order to obtain optimum results.

The hydrogenation according to the present invention can be effected with or without the presence of ammonia. The presence of ammonia in the reaction mixture results in the additional formation of a 1,5-diamine, as for instance 1,5-diaminohexane, when the starting product is a N-substituted 5-cyanopentanone-2-imine. The resulting diamine may then be recovered as by-product.

The hydrogenation reaction according to the present invention can be accomplished in various ways, both continuously and discontinuously. One way is in a diluent. Very suitable diluents are water or lower molecular weight alcohols, for instance methanol, ethanol and propanol or hydrocarbons such as pentane, hexane, cyclohexane and decaline or ethers such as diethylether and dioxane.

In the following examples, the process according to the invention will be further elucidated without limitation thereto. Unless otherwise indicated, all parts and percentages are given by weight.

EXAMPLE I

Raney cobalt (15 g) and methanol (200 ml) are introduced into a 2-liter autoclave equipped with a stirrer and a feed line. Hydrogen is fed into the autoclave to build up a pressure of 50 atmospheres, and the mixture in the autoclave is then heated to 120°C. At this temperature a solution of N-cyclohexyl-5-cyanopentanone-2-imine (144 g) in 350 ml of methanol is fed into the reaction container over a period of two hours' time, with stirring. The feed line is next flushed with methanol (100 ml) and stirring is continued for 1.5 hours at a temperature of about 120°C. After cooling to room temperature the autoclave is opened, the catalyst recovered by filtration, and most of the methanol removed by distillation. Mass-spectrometric and gas-chromatographic analyses show the remaining liquid to contain 70.1 grams of 2-methyl piperidine and 72.8 g of cyclohexyl amine. Calculated on the original amount of cyanoketoimine, this represents a 2-methyl piperidine efficiency of 94 percent and a cyclohexyl amine efficiency of 98 percent.

EXAMPLE II

Raney nickel (4 g) and methanol (25 ml) are fed into a 0.5-liter autoclave provided with a stirrer and a feed line. Thereafter hydrogen is introduced into the autoclave to build up a pressure of 40 atmospheres, and the mixture in the autoclave is then heated to 130°C. At this temperature a solution of N-isopropyl-5-cyanopentanone-2-imine (18.8 g) in methanol (40 ml) is added over a period of 1 hour, with stirring, after which the feed line is flushed with methanol (100 ml), and stirring is continued for one more hour at about 130°C. After cooling to room temperature, the pressure in the autoclave is bled off through a reflux cooler cooled with a mixture of carbon dioxide and acetone. The autoclave is then opened, and the catalyst recovered by filtration. The reaction mixture was found to contain a solution of 11.9 g of 2-methyl piperidine and 6.7 g of isopropyl amine in methanol. Calculated to the amount of starting product, the 2-methyl piperidine efficiency is 97 percent and the isopropyl amine efficiency 92 percent.

EXAMPLE III

In the same manner as described in Example II, N-hexyl-5-cyanopentanone-2-imine (26.2 g) dissolved in methanol (50 ml) is hydrogenated at a temperature of 120°–125°C. After cooling to room temperature, the autoclave is opened, the catalyst recovered by filtration and most of the methanol removed by distillation. The yield is 12.2 g of 2-methyl piperidine (efficiency 91 percent) and 12.1 g of hexyl amine (efficiency 89 percent).

EXAMPLE IV

Raney nickel (5 g) and methanol (30 ml) are fed into a 0.5-liter autoclave equipped with a stirrer and a feed line. Thereafter hydrogen is supplied into the autoclave to a final pressure of 55 atmospheres, and the mixture is subsequently heated in the autoclave to 125°C. At this temperature, 27.4 g of a mixture composed of about 85 percent of N-cyclohexyl-5-cyano-3-methyl-pentanone-2-imine and about 15 percent of N-cyclohexyl-6-cyanohexanone-3-imine, dissolved in 40 ml of methanol is added to the mixture in the autoclave over a period of one hour, with stirring. The feed line is flushed with methanol (100 ml), after which stirring is continued for another hour at 125°C. After cooling to room temperature the autoclave is opened, the catalyst recovered by filtration, and most of the methanol removed by distillation. The remaining liquid contains 11.1 g of 2,3-dimethyl piperidine, 2.3 g of 2-ethyl piperidine, and 12.9 g of cyclohexyl amine. Calculated with respect to the amount of starting product, the overall efficiency with respect to both piperidines is 89 percent and the cyclohexyl amine efficiency is 98 percent.

EXAMPLE V

Raney nickel (5 g), ammonia (68 g), and methanol (30 ml) are introduced into a 0.5-liter autoclave equipped with a stirrer and a feed line. Hydrogen is then fed into the autoclave to a final pressure of 65 atmospheres, after which the mixture in the autoclave is heated to 115°C. At this temperature, N-cyclohexyl-5-cyanopentanone-2-imine (38.4 g) dissolved in 50 ml of methanol (50 ml) is added, with stirring, over a period of 1.5 hours, whereupon the feed line is flushed with methanol (100 ml), and stirring is continued for 1.5 hours at about 130°C. After cooling to room temperature the autoclave is opened, the catalyst recovered by filtration, and methanol removed by distillation.

The remaining liquid contains 8.5 g of 2-methyl piperidine (efficiency 43 percent), 10.4 g of 1,5-diaminohexane (efficiency 45 percent), and 17.8 g of cyclohexyl amine (efficiency 90 percent).

EXAMPLE VI

N-cyclohexyl-5-cyanopentanone-2-imine (19.2 g), propanol (100 ml) and Raney nickel (3 g) are introduced into 250 ml reaction vessel equipped with a gas feed line. The reaction vessel is connected through the gas feed line to a storage vessel containing hydrogen under approximately atmospheric pressure. Thereafter the mixture, while being constantly shaken in a shaking machine, is heated to about 80°C, and kept at this temperature for about 5 hours. The uptake of hydrogen, which starts at 40°C, has been completed at the end of the 5 hour period. After cooling to room temperature, the catalyst is recovered by filtration.

The resulting solution was found to contain 9.2 g of 2-methyl piperidine and 9.0 g of cyclohexyl amine in propanol. Calculated to the amount of starting product, the 2-methyl piperidine efficiency is 93 percent and the cyclohexyl amine efficiency 91 percent.

EXAMPLE VII

Raney nickel (3 g), N-cyclohexyl-5-cyanopentanone-2-imine (30 g) and water (250 g) are introduced into a 0.5-liter autoclave equipped with a stirrer. Hydrogen is then fed into the autoclave, to a final pressure of 70 atmospheres. The mixture is then heated to 110°C with stirring and maintained at this temperature for 1 hour. After cooling to room temperature the autoclave is opened, the catalyst recovered by filtration, and the filtrate is distilled. In addition to water, the resulting filtrate contains 12.6 g of 2-methyl piperidine and 14.2 g of cyclohexyl amine. The 2-methyl piperidine efficiency is 81 percent and the cyclohexyl amine efficiency 92 percent.

What is claimed is:

1. A process for producing a mixture of C-substituted piperidine having the formula

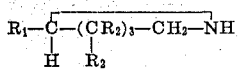

and a primary amine having the formula $R-NH_2$ wherein R and $R_1$ are independently selected from the class consisting of alkyl, cycloalkyl and aryl groups of from one to 10 carbon atoms; and each of the six $R_2$ substituents is independently selected from the class consisting of a hydrogen atom, R and $R_1$ as defined above, with the proviso that at least four of said $R_2$ substituents are hydrogen atoms, which process comprises hydrogenating an N-substituted γ-cyanoketoimine having the formula

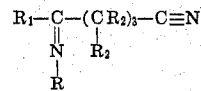

wherein R, $R_1$ and $R_2$ have the same meaning as defined above, in the presence of a hydrogenation catalyst, at a temperature of from about 35°C to 300°C. and in the absence of ammonia.

2. The process according to claim 9 wherein R is selected from the class consisting of isopropyl and cyclohexyl substituents.

3. The process according to claim 9 wherein the hydrogenation is conducted at a pressure of from about 1 to about 150 atmospheres.

4. The process according to claim 9 wherein the hydrogenation is conducted at a temperature of about 50° to 175°C.

5. The process according to claim 9 wherein the hydrogenation catalyst is a Raney-type catalyst.

6. The process according to claim 9 wherein the hydrogenation is conducted in a diluent.

7. The process according to claim 6 wherein the diluent is selected from the class consisting of a lower alkanol and water.

* * * * *